US008322690B2

(12) United States Patent
Cathlina

(10) Patent No.: US 8,322,690 B2
(45) Date of Patent: Dec. 4, 2012

(54) CABLE DRESSING FIXTURE

(76) Inventor: Matthew Cathlina, Libertyville, IL (US)

( * ) Notice: Subject to any disclaimer, the term of this patent is extended or adjusted under 35 U.S.C. 154(b) by 954 days.

(21) Appl. No.: 12/392,803

(22) Filed: Feb. 25, 2009

(65) Prior Publication Data

US 2010/0212263 A1 Aug. 26, 2010

(51) Int. Cl.
*H02G 1/08* (2006.01)
(52) U.S. Cl. .................. 254/134.3 FT; 254/134.3 R
(58) Field of Classification Search ......... 254/134.3 FT, 254/134.3 R, 134, 4
See application file for complete search history.

(56) References Cited

U.S. PATENT DOCUMENTS

| 4,457,527 | A | * | 7/1984 | Lowery | 280/47.19 |
| 5,066,832 | A | * | 11/1991 | Clarey et al. | 174/50 |
| 5,464,193 | A | * | 11/1995 | Wrate | 254/134.3 FT |
| 5,687,928 | A | * | 11/1997 | Lassiter | 242/557 |
| 6,727,432 | B2 | * | 4/2004 | Sato | 174/663 |
| 7,377,013 | B2 | * | 5/2008 | Cheung | 24/16 PB |
| 7,882,600 | B2 | * | 2/2011 | Judd | 24/115 R |
| 7,931,227 | B1 | * | 4/2011 | Oudekerk | 242/557 |
| 2004/0188130 | A1 | | 9/2004 | Herrera | |
| 2010/0212263 | A1 | * | 8/2010 | Cathlina | 53/444 |

OTHER PUBLICATIONS

"The Cable Dresser" by Patch Panel Tools.

* cited by examiner

*Primary Examiner* — Lee D Wilson
(74) *Attorney, Agent, or Firm* — Howard B. Rockman

(57) ABSTRACT

A fixture for dressing a plurality of cables into cable bundles is provided. The fixture includes a first panel having a plurality of first apertures extending through the panel. The first apertures are configured in a predetermined array in the first panel, with each first aperture located a first distance from each adjacent first aperture. A second panel is disposed at a distance from the first panel, the second panel having a plurality of second apertures extending through the second panel. The second apertures are configured in a second array corresponding to the array of apertures in the first panel. Each second aperture is located a second distance from each adjacent second aperture. The first plurality of apertures receives a plurality of cables fed into the fixture. The second plurality of apertures is adapted to receive the cables from the first apertures and to feed the cables from the fixture in a cable array ready to be tied into a bundle.

17 Claims, 7 Drawing Sheets

CABLE DRESSING FIXTURE

BACKGROUND OF THE INVENTION

1. Field of the Invention

The present invention relates to cable dressing fixtures for bundling wires and cables, and particularly to a cable dressing fixture that provides a device to bundle large quantities of Category 5 or Category 6 network cable or wire runs with reduced strain on a cable technician's body while also increasing the productivity and efficiency of the bundling process.

2. The Problem to be Solved

Dressing of network cabling involves organizing multiple cables in a bundle where the relative location of each individual cable is maintained in its location within the cross-section throughout the length of the run. A bundle is usually comprised of twelve cables, but bundles can also be composed of larger quantities, usually in multiples of twelve.

Dressing of cable is required for the following reasons:
1) Removes tangles from large numbers of cable so the cables route to the required destination without creases that may cause network performance issues;
2) Allows for easier installation of cable into the selected environment;
3) Aids in tracing, troubleshooting and potential future replacement;
4) Minimizes space required for network cabling; and
5) Provides fit and finish of the data center/IT room environment.

The conventional process of dressing cable takes place after each cable to be bundled has been pulled from a quantity of boxes or spools. Because each cable has already been pulled from the box or spool, there is a high incidence of cable entanglement. It takes the technician a much longer time to dress the cable than it does in marking and pulling the cable. Additionally, the present process of dressing takes a toll on the technician's hands, wrists, arms, and back.

There are several presently available alternate methods of dressing cables, and two of these methods do not result in dressing the cable. The first involves the use of a wire basket, where cables are not bundled, but simply laid in the wire basket and not dressed. This unbundled method does not work for ladder racks, commonly used in the communications industry. This alternative does not result in dressing the cables.

Also, a mesh sleeve can be pulled over groups of cables to keep the cables together in a loose fashion. This is not truly bundling the cables, but rather loosely grouping the cables. Using a mesh sleeve takes up more cross-sectional space since the cables are not tightly pulled together. The mesh sleeve veils the cable and therefore troubleshooting and cable replacement are not easily accomplished.

Additionally, an untangling comb can be used to aid in dressing the cable after it has been pulled. The comb is used for only 24 cable runs, and a 12 cable version of this product is not offered. The cables that pass through the core of the comb are not aligned or dressed, and therefore tangles will still be apparent in these core cables.

At present, cable bundling fixtures are not available. The cable bundling aids presently available serve only to untangle cable runs previously pulled, and do not bundle the cable as the cable is being pulled. Due to the manual effort currently required to pull and bundle cables used in communication systems, for example, a need exists for a fixture that will save hours of labor on small projects, and days of labor on large projects, thereby increasing productivity. In addition, there is a need for a cable dressing fixture and system that reduces or eliminates potentially serious ergonomic issues involving the user's hands, back, neck and wrists that are inherent in presently available cable bundling techniques and devices.

SUMMARY OF THE INVENTION

The cable dressing fixture of the present invention is introduced to a plurality of cables immediately after each cable leaves the box or spool storing the cable. The various cable runs are brought together within a few feet of leaving the box or spool. This circumvents long lengths of cable becoming entangled, and also affords the cable technician a much easier process of bundling. Using the cable dressing fixture of the present invention reduces the cycle time of the entire process, reduces the strain on the technician's body and provides higher quality cable dressing.

The cable dressing fixture of the present invention also provides an additional level of quality control that would otherwise not be available to the cable installation technician. The present cable dressing fixture allows the technician to identify imperfections in the winding and fabrication of the cable as the cable passes into and out of the fixture. Imperfections occasionally occur in the fabrication and winding of the cable, which show up as knots or an expansion in the diameter of the cable. Since the cabling fixture of the present invention routes each cable through a series of smaller diameter holes, the imperfect cable with the knot will not pass through the fixture.

A defective cable can be identified and replaced as soon as it is removed from its storage box or spool. In prior conventional processes, the defect would likely not be detected until after termination and during testing. The cost of replacement at this point in the process is significantly higher than if the defective cable were replaced during the pulling phase of the process. When detected during the pulling process and using the cable dressing fixture of the present invention, the defective cable can be replaced with very little impact on labor and material productivity.

DETAILED DESCRIPTION OF THE ILLUSTRATED EMBODIMENTS

Figure 1:
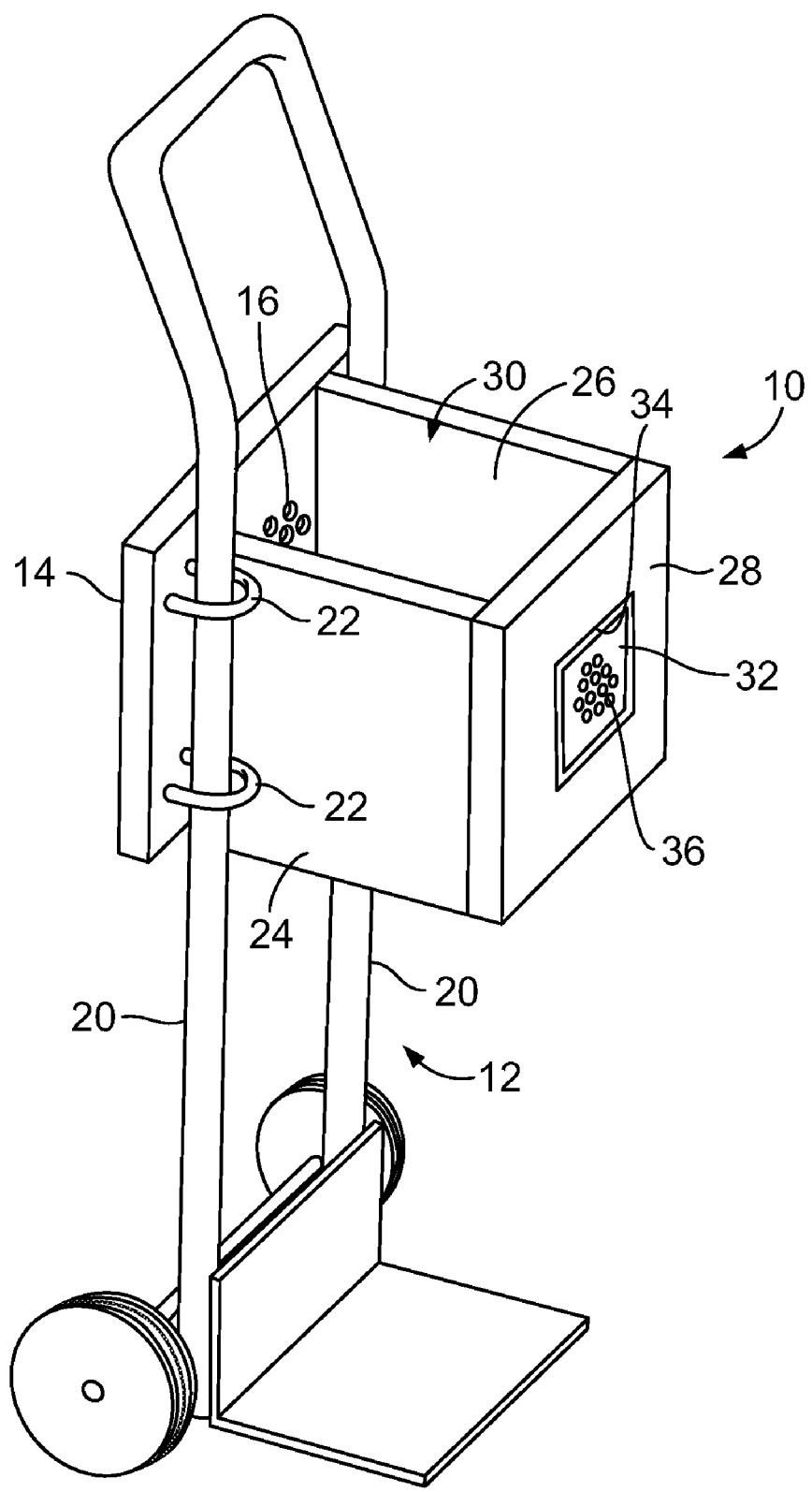
FIG. 1 is a perspective view of the cable dressing fixture of the present invention shown mounted on an optional mobile hand truck.

Referring to FIGS. 1-7, the cable dressing fixture of the present invention is generally designated by the numeral 10. The fixture 10 is shown mounted on an optional wheeled hand cart 12 to provide mobility to the fixture if desired. The fixture 10 could be supported by, or mounted on, other types of structures other than hand cart 12. The fixture height is desirably set on the hand cart 12 at a comfortable position while the cable technician is seated although the fixture 10 could be used at any height.

The cable fixture 10 includes a rear panel 14 having a plurality of apertures 16 extending through rear panel 14. To provide a smooth surface for cables 15 passing through apertures 16, each aperture may have a grommet 18 (FIG. 2) inserted into the aperture, with each grommet 18 having an axial length substantially equal to the axis depth of a corresponding aperture 16, and providing a smooth surface on the inner wall of each aperture. The rear panel 14 may be made of wood, plastic, metal, composite material, or any other material that will provide a firm base through which apertures 16 extend. The grommets 18 may be made of plastic, rubber, composite material or any other material that provides a smooth liner surface for the apertures 16.

Figure 2:
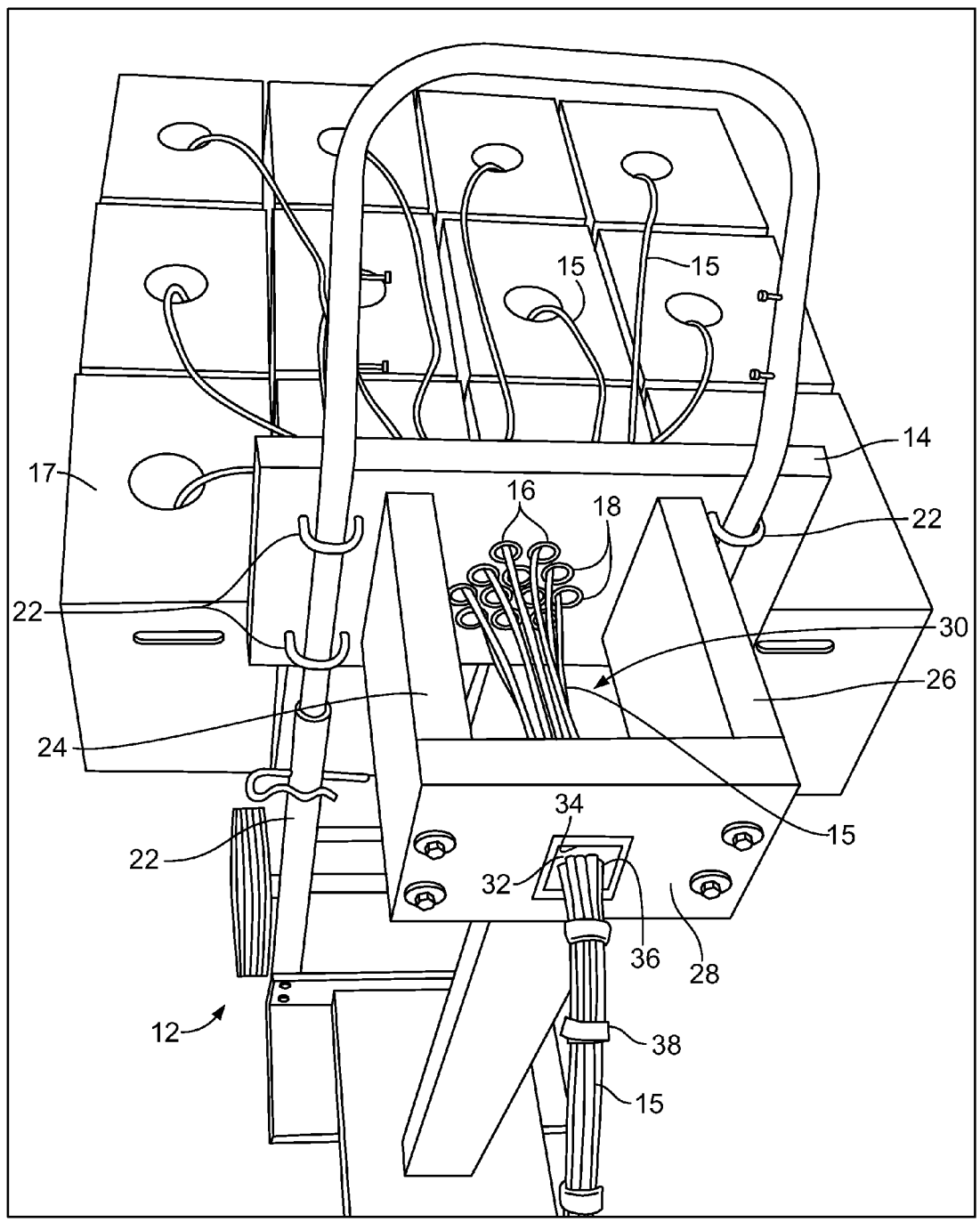
FIG. 2 is a top perspective view of the cable dressing fixture and optional mobile hand truck of FIG. 1, showing the cable dressing fixture adjacent twelve boxes of Category 6 electrical cable, with each cable extending from the rear to the front of the cable dressing fixture and with dressing bands applied to portions of the cable extending outward from the fixture.
Figure 3:
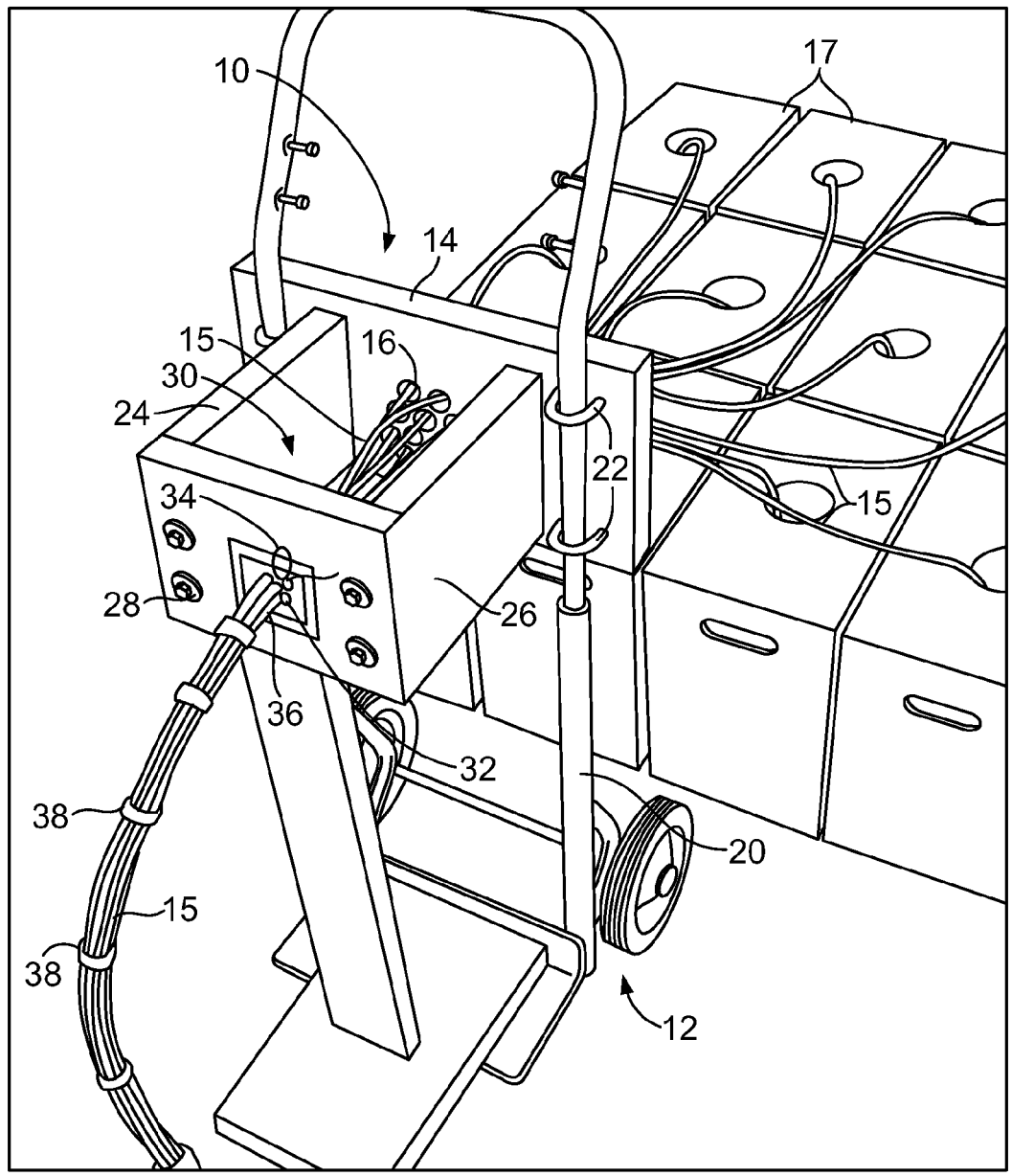
FIG. 3 is an alternate top side perspective view of the cable dressing fixture, mobile hand truck and electrical cable boxes shown in FIG. 2.
Figure 4:
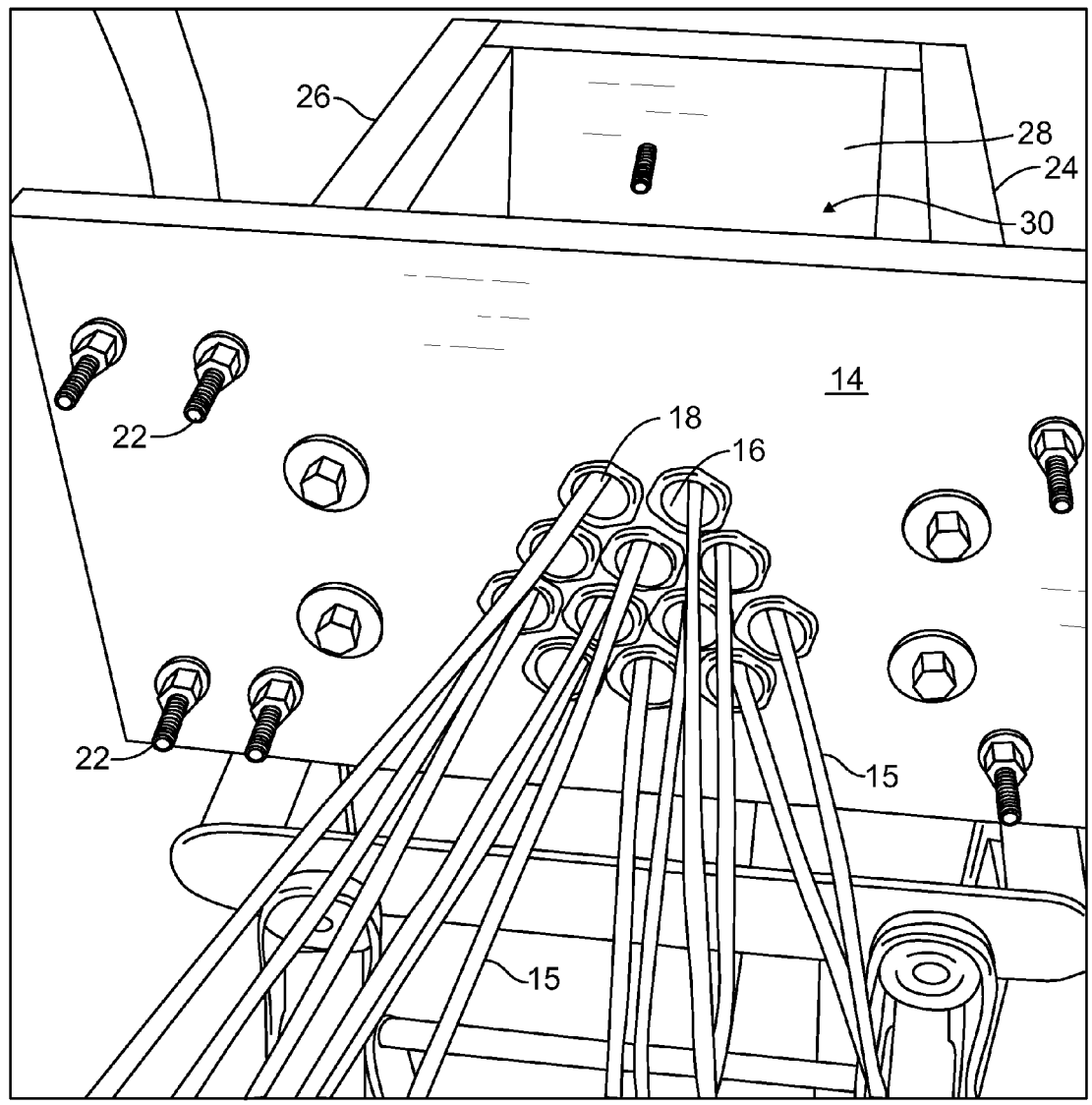
FIG. 4 is a rear end perspective view of the cable dressing fixture of FIGS. 1-3, illustrating a plurality of electrical cables each threaded into a large aperture in the rear panel of the cable dressing fixture.
Figure 5:
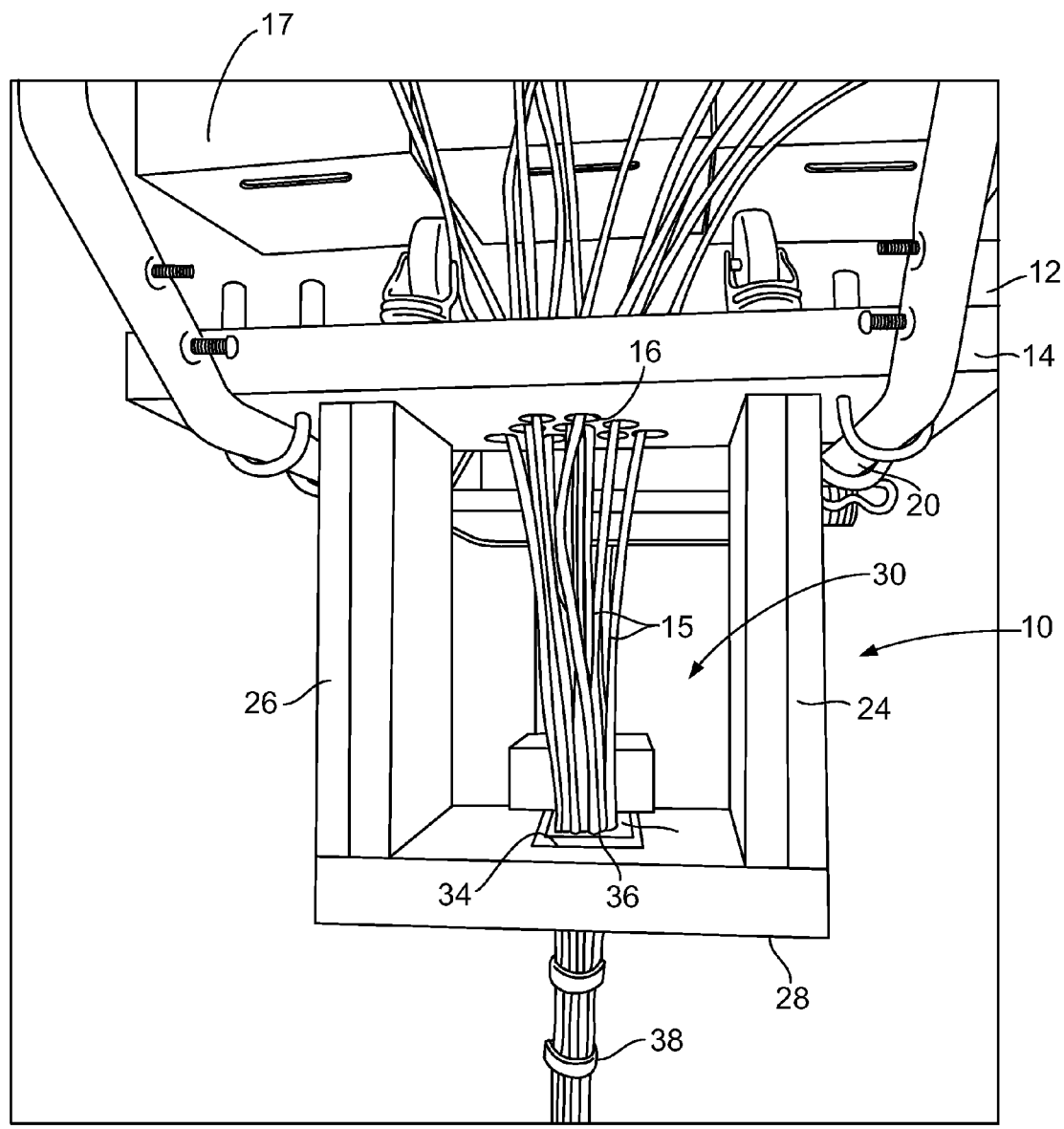
FIG. 5 is a top view of the cable dressing fixture of FIGS. 1-3, showing electrical cables extending from the larger aperture in the rear panel of the fixture, through the open central portion of the fixture, and out of a plurality of smaller apertures in the front panel of the fixture.
Figure 6:
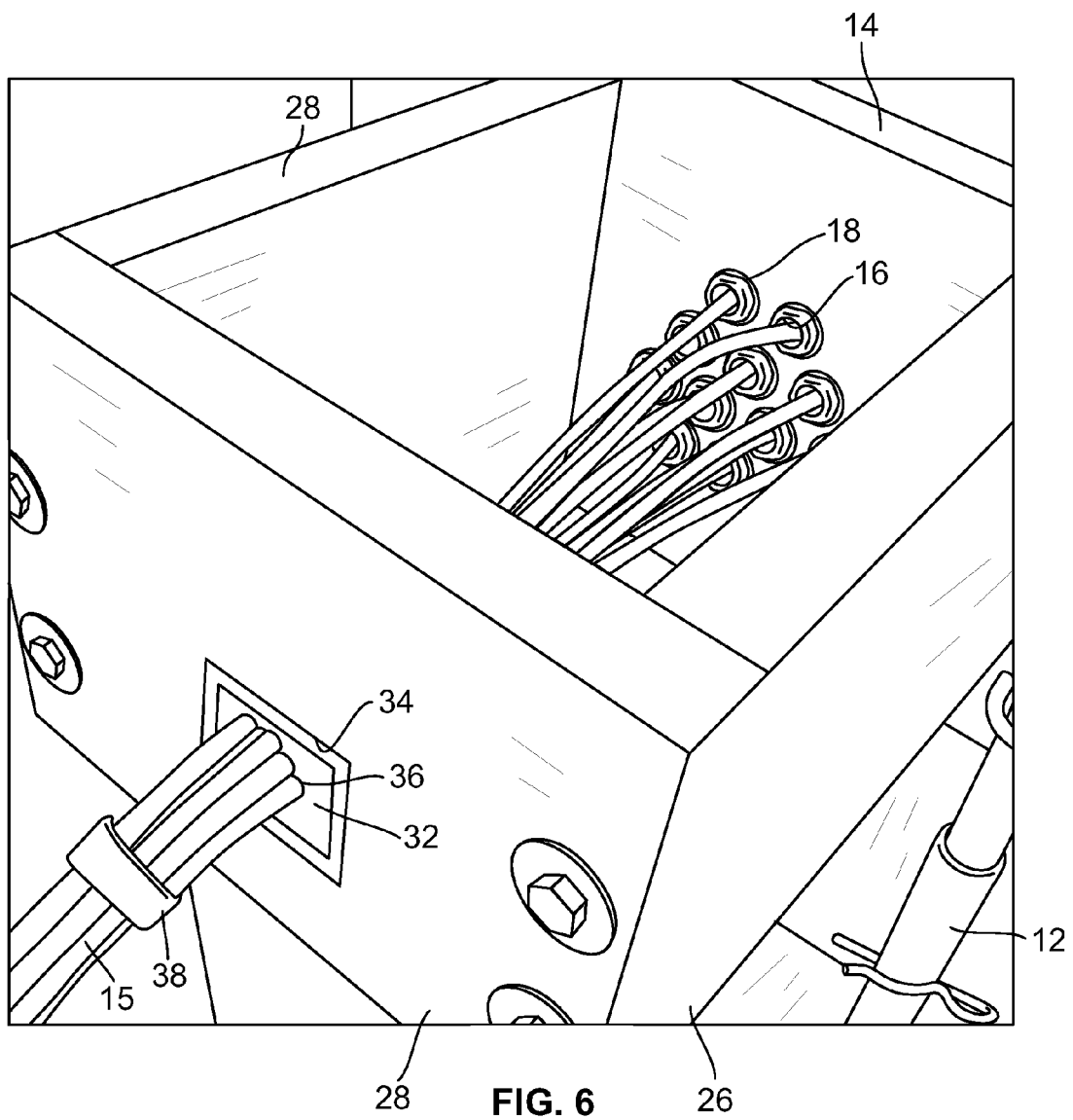
FIG. 6 is a front perspective view of the plurality of electrical cables exiting through the plurality of smaller apertures extending through the removable plate inserted in the front panel of the cable dressing fixture of FIGS. 1-3.

The rear panel 14, in the illustrated embodiment, is fastened to upstanding members 20 of hand cart 12 by a plurality of U-bolts 22 on both lateral sides of rear panel 14, as seen in FIGS. 2 and 3. A pair of spaced apart side panels 24, 26 are firmly connected to and extend outward from rear panel 14. A front panel 28 extends across cable dressing fixture 10, and is attached to the front ends of side panels 24, 26. An opening 30 is formed in fixture 10 between rear panel 14, front panel 28, and the two side panels 24, 26 for purposes to be explained.

An outlet panel or die 32 is removably mounted in an aperture 34 extending through front panel 28. Outlet panel 32 may be removably fastened in aperture 34 by using bolts, screws or any other removable fastening device as is known in the art. Outlet panel 32 includes a plurality of smooth innerwall fine alignment apertures 36 that extend completely through outlet panel 32. Apertures 36 are formed in a predetermined pattern that corresponds to the desired tight bundle cross-sectional array and quantity of cables 15 to be pulled through apertures 16 and 36 and bound together, as will be explained. In an embodiment, apertures 36 may be lined with grommets 18.

Apertures 36 in front panel 28 each have a smaller diameter than apertures 16 in rear panel 14. However, the inner diameter of each aperture 36 is slightly larger than the outer diameter of the cable 15 to be pulled through each aperture 36. Outlet panel 32 is removable from and replaceable in front panel 28 in the illustrated embodiment of the present invention to allow interchangeable outlet panels or dies 32 to be inserted into aperture 34, wherein the apertures in outlet panel 32 are sufficiently sized to permit cables of varying diameters to pass through apertures 36 with relative ease, such as Category 5E, 6, 6A cables and the like. The outlet panel 32 can also be configured to prepare cable bundles of twelve cables 15 (FIG. 2) or twenty four cables (not shown).

In an embodiment of the present invention, apertures 16 in rear panel 14 may be located on a removable, interchangeable panel (not shown) similar to outlet panel or die 32 in front panel 28.

A. To provide a suitable description of the operation of the cable dress fixture 10 in creating suitable tight bundles of cable 15, the process of dressing cables without using the cable dressing fixture of the present invention will be described initially.

1. Setup Without Cable Dressing Fixture

Category 5 and 6 patch panel equipment is designed in multiples of 12 ports (i.e., 12 port, 24 port, 48 port patch panels) and therefore when pulling cable 15 to interconnect these panels, it is most efficient to also use multiples of twelve cables in a bundle. The present example will use twelve cables.

2. Marking

When pulling cable 15 without an alignment fixture, the technician arranges twelve boxes or spools 17 of cable (FIG. 2) and labels the boxes with port numbers, for example 1→12, 13→24, 25→36, 37→48. The technician then numbers the end of each cable 15 with the corresponding port number using a marker.

3. Pulling

Once all the cables 15 are marked with the associated port number, the technician pulls all twelve cables the required distance, which could be eighty feet for example. The technician then returns to the cable boxes 17 and marks the other end of each cable 15 with the corresponding port number and then cuts the cables from the boxes or spools.

4. Dressing

Dressing the cables 15 organizes the cables into bundles and eliminates twists and tangles that may crease the cable, thereby creating an impedance rise in the cable which is detrimental to network performance. Dressing the cables also allows for easier installation and removes the potential for cables to be caught on infrastructure or equipment during and after installation. Dressing the cables into bundles also creates a very tight and organized appearance which creates a professional aesthetic for the environment. Finally, dressing the cables allows for ease of troubleshooting and replacement if required in the future.

The process of manually dressing the cables 15 involves manually clasping the cables together in a bundle with each cable positioned in a set cross-sectional location within the bundle. The cable technician then works the cable bundle by hand to maintain the relative location of each cable in the bundle throughout the length of the run. This is a time consuming and laborious process because most cables will tend to coil and this creates tangles in the cables. Additionally, the technician must be continually compressing the cable bundle to maintain the cable positions within the bundle cross-section while attaching a hook-and-loop type fastener 38 (FIGS. 2, 3) around the bundle to maintain the cables compressed against adjacent cables. A common result of the manual dressing process is carpal tunnel inflammation, since the technician is required to tightly grip the cable throughout this process. This dressing process is usually conducted while the cable technician is standing up with little motion during an extended period of time. Once the bundle has been worked throughout the entire length with hook-and-loop type bands 38 installed every six inches or so, the cable is fully dressed and ready for installation.

5. Installation

The dressed cable bundle may be routed through many different types of supports. The most common use in a data center is cable supported by ladder rack (not shown). Ladder rack will be used in this example.

Ladder rack is installed on the top of cabinets and between rows of cabinets that house network and server equipment to provide a cable runway. Bundles of cables are placed on the ladder rack with one end originating in a network rack and the other end reaching a server cabinet. Once the bundle of cables is routed between the appropriate two cabinets, each port is terminated on the patch panel located in the cabinet/rack. When all the ports have been terminated on patch panels at both ends, the ports are tested and certified. The ports can now be used to transmit network signals connecting various network and server devices.

B. Next, the process of using the cable dressing fixture 10 of the present invention is described.

1. Setup Using the Cable Dressing Fixture

Figure 7:
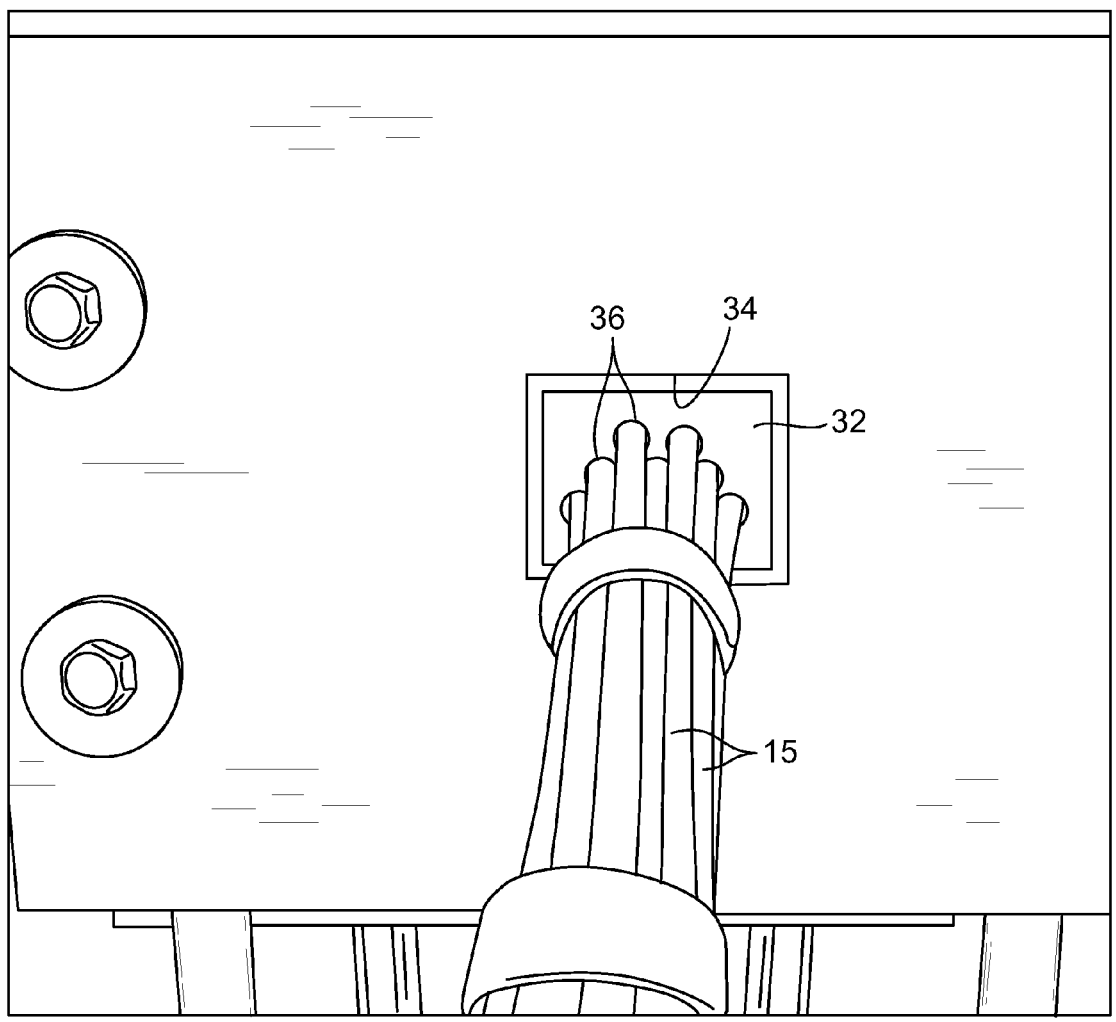
FIG. 7 is a close-up front perspective view of a plurality of dressed cables extending outward from the apertured removable plate lodged in the front panel of the cable dressing fixture of the present invention.

The setup proceeds just as stated above, except the cable dressing fixture 10 is positioned next to the boxes/spools 17 of cable 15 and each cable is threaded into one of the apertures 16 in the rear panel 14 of the fixture 10. Each cable 15 is passed across opening 30 of fixture 10, and fed through a corresponding aperture 36 in die 32. For example, the top right cable extending through the upper right aperture 16 in rear panel 14 is fed through the upper right aperture of die 32. This process is continued, until each cable 15 extends outward from die 32 and away from fixture 10, as seen in FIGS. 2 and 7. Once all of the cables are threaded through the fixture 10, they now have a fixed position relative to other cables in the bundle. When all the cables are threaded through the fixture, they emerge from the outlet die 32 of the cabling fixture in a tight bundle.

2. Marking

Cables 15 are marked as detailed above.

3. Pulling

As the technician pulls the cables 15 through the cable dressing fixture, each cable retains its relative position in the bundle as cable is pulled from the boxes 17. As the cable comes out of front panel 28 of fixture 10, the technician fastens the hook-and-loop fasteners 38 to maintain the tight bundle cross-section. Therefore, proper bundling automatically occurs as cable is pulled through front panel 28 of the fixture, thereby eliminating the separate manual dressing process.

It is important to note that this process can now be performed while the technician is seated.

4. Dressing

The difficult and time consuming process of manual dressing is eliminated.

5. Installation

The installation process occurs as detailed above.

It should be recognized that, while the present invention has been described in relation to the illustrated embodiments thereof, those skilled in the art may develop a wide variation of structural and operational details without departing from the principles of the invention. Therefore, the appended claims are to be construed to cover all equivalents falling within the true scope and spirit of the invention.

I claim:

1. A fixture for dressing a plurality of cables into cable bundles, comprising:
   a first panel having a plurality of first apertures extending through said panel, said first apertures configured in a predetermined array in said first panel, each said first aperture located a first distance from each adjacent first aperture, each said first aperture having a first diameter greater than the diameter of each cable of said plurality of cables;
   a second panel disposed at a distance from said first panel, said second panel having a plurality of second apertures extending through said second panel, said second apertures configured in a second array corresponding to said array of apertures in said first panel, each said second aperture located a second distance from each adjacent second aperture, each said second aperture having a second diameter less than said first diameter of each said first aperture;
   said first plurality of apertures adapted to receive a plurality of cables fed into said fixture, said second plurality of apertures adapted to receive said cables from said first apertures and to feed said cables from said fixture in a cable bundle.

2. The fixture of claim 1, wherein:
   said first distance between adjacent first apertures in said first panel is greater than said second distance between adjacent second apertures in said second panel.

3. A fixture for dressing a plurality of cables into cable bundles, comprising:
   a first panel having a plurality of first apertures extending through said panel, said first apertures configured in a predetermined array in said first panel, each said first aperture located a first distance from each adjacent first aperture, each said first aperture having a first diameter greater than the diameter of each cable of said plurality of cables;
   a second panel disposed at a distance from said first panel, said second panel having a plurality of second apertures extending through said second panel, said second apertures configured in a second array corresponding to said array of apertures in said first panel, each said second aperture located a second distance from each adjacent second aperture, each said second aperture having a second diameter less than said first diameter of each said first aperture;
   said first plurality of apertures adapted to receive a plurality of cables fed into said fixture, said second plurality of apertures adapted to receive said cables from said first apertures and to feed said cables from said fixture in a cable bundle;
   said second panel includes an additional aperture;
   a first die plate removably attached to said second panel in said additional aperture;
   said plurality of second apertures extending through said first die plate.

4. A fixture for dressing a plurality of cables into cable bundles, comprising:
   a first panel having a plurality of first apertures extending through said panel, said first apertures configured in a predetermined array in said first panel, each said first aperture located a first distance from each adjacent first aperture, each said first aperture having a first diameter greater than the diameter of each cable of said plurality of cables;
   a second panel disposed at a distance from said first panel, said second panel having a plurality of second apertures extending through said second panel, said second apertures configured in a second array corresponding to said array of apertures in said first panel, each said second aperture located a second distance from each adjacent second aperture, each said second aperture having a second diameter less than said first diameter of each said first aperture;
   said first plurality of apertures adapted to receive a plurality of cables fed into said fixture, said second plurality of apertures adapted to receive said cables from said first apertures and to feed said cables from said fixture in a cable bundle;

said second panel includes an additional aperture;

a first die plate removably attached to said second panel in said additional aperture;

said plurality of second apertures extending through said first die plate;

said first die plate is interchangeable with additional die plates, each said additional die plate having apertures extending therethrough of different diameters than said apertures in said first die plate.

5. The fixture of claim 1, wherein:
said fixture is mounted on a mobile support structure.

6. The fixture of claim 5, wherein:
said mobile support structure is a hand cart.

7. The fixture of claim 2, wherein:
a pair of spaced side panels are attached at one end to, and extend outwardly from, said first panel in the axial direction of said first apertures;
said second panel attached to a second end of said pair of side panels;
said second apertures in said second panel extending in the same axial direction as the axial direction of said first apertures in said first panel.

8. The fixture of claim 1, wherein:
each of said first apertures includes a grommet adapted to slidably receive one of said cables.

9. The fixture of claim 8, wherein:
each of said second apertures includes a grommet adapted to slidably receive one of said cables as said cables are extended outward from said first apertures.

10. The fixture of claim 1, wherein:
an opening is provided in said fixture between said first panel and said second panel;
said opening adapted to receive said cables when said cables are extended outward from said first plurality of apertures toward said second apertures.

11. A method of dressing individual cables into a bundle of cables, comprising the steps of:
extending a plurality of individual cables from supports holding each individual cable;
feeding each individual cable into one of a plurality of first apertures located in a panel, said first apertures arrayed in a first array, said first apertures located a first distance from each adjacent first aperture, and each said first aperture having a first diameter greater than the diameter of each cable of said plurality of cables;
feeding each individual cable from said plurality of first apertures to a plurality of second apertures located in a second panel, each of said plurality of second apertures located a second distance from each adjacent second aperture, said second apertures formed in an array corresponding to said array of apertures in said first panel, and each said second aperture having a second diameter less than said first diameter of each said first aperture;
extending each said individual cable from said plurality of second apertures in a direction away from said second panel;
applying a fastener to said plurality of individual cables to form a bundle of said individual cables.

12. The method of claim 11, wherein:
said first distance between adjacent first apertures in said first panel is greater than the second distance between said second apertures in said second panel.

13. The method of claim 11, wherein the fastener is a releasable hook-and-loop type fastener.

14. A method of dressing individual cables into a bundle of cables, comprising the steps of:
extending a plurality of individual cables from supports holding each individual cable;
feeding each individual cable into one of a plurality of first apertures located in a panel, said first apertures arrayed in a first array and said first apertures located a first distance from each adjacent first aperture;
feeding each individual cable from said plurality of first apertures to a plurality of second apertures located in a second panel, each of said plurality of second apertures located a second distance from each adjacent second aperture, said second apertures formed in an array corresponding to said array of apertures in said first panel, said second plurality of apertures located in a replaceable die plate, said die plate removably attached to said second panel,
extending each said individual cable from said plurality of second apertures in a direction away from said second panel;
applying a fastener to said plurality of individual cables to form a bundle of said individual cables.

15. The method of claim 11, wherein:
extended cables from the second panel are merged together in a bundle.

16. The method of claim 11, wherein:
extending cables from the second panel ensures a fixed location of each cable within the bundle.

17. The fixture of claim 1, wherein:
The plurality of first apertures are connected to the plurality of second apertures via a plurality of conduits.

* * * * *